United States Patent [19]
Varghese et al.

[11] Patent Number: 6,011,795
[45] Date of Patent: Jan. 4, 2000

[54] METHOD AND APPARATUS FOR FAST HIERARCHICAL ADDRESS LOOKUP USING CONTROLLED EXPANSION OF PREFIXES

[75] Inventors: George Varghese, St. Louis; Srinivasan Venkatachary, University City, both of Mo.

[73] Assignee: Washington University, St. Louis, Mo.

[21] Appl. No.: 08/821,100

[22] Filed: Mar. 20, 1997

[51] Int. Cl.[7] .................................................. H04L 12/46
[52] U.S. Cl. ...................... 370/392; 370/401; 395/200.75
[58] Field of Search .................... 370/392, 393, 370/401, 402, 403, 404, 405, 466, 467; 395/200.68, 200.75

[56] References Cited

U.S. PATENT DOCUMENTS

| | | | |
|---|---|---|---|
| 4,897,814 | 1/1990 | Clark ........................................... | 365/49 |
| 5,247,620 | 9/1993 | Fukuzawa et al. ...................... | 370/402 |
| 5,261,090 | 11/1993 | Lien ......................................... | 395/600 |
| 5,313,465 | 5/1994 | Perlman et al. ......................... | 370/403 |
| 5,386,413 | 1/1995 | McAuley et al. ......................... | 370/54 |
| 5,414,704 | 5/1995 | Spinney .................................... | 370/60 |
| 5,446,887 | 8/1995 | Berkowitz ............................... | 395/600 |
| 5,459,717 | 10/1995 | Mullan et al. ............................ | 370/54 |
| 5,761,440 | 6/1998 | De Marco et al. ...................... | 370/392 |
| 5,781,772 | 7/1998 | Wilkinson, III et al. ................ | 370/229 |
| 5,842,224 | 11/1998 | Fenner .................................... | 370/392 |
| 5,856,974 | 1/1999 | Gervais et al. ......................... | 370/401 |

OTHER PUBLICATIONS

Perlman, Radia, 9.7 Address Matching, *Interconnection Bridges and Routers*, pp. 233–239.

Wright, Gary R., Radix Tree Routing Tables, *TCP/IP Illustrated, Volume 2, The Implementation*, pp. 559–569.

Mills, Don, The Art of Computer Programming, *Volume 3/Sorting and Searching*, pp. 481–499.

*Primary Examiner*—Min Jung
*Attorney, Agent, or Firm*—Howell & Haferkamp, L.C.

[57] ABSTRACT

Many network protocols, including the Internet, have addresses that are structured hierarchically. The hierarchy is expressed by an address prefix P that represents all addresses in the given hierarchical level that starts with prefix P. The hierarchy is not strict and can be overridden by more inclusive hierarchies. This is achieved by having network routers find the longest prefix that matches a destination address in a message.

The disclosed invention describes a method and apparatus for implementing controlled expansion: for expanding a set of prefixes into an equivalent (possibly larger) set of prefixes that have a smaller set of prefix lengths. The new set of prefixes can then be looked up significantly faster using any technique whose speed improves by reducing the number of prefix lengths. Our invention also incorporates fast techniques to insert and delete new prefixes, and a technique of pointer hoisting to halve the memory READs needed for trie search. Our solution to longest matching prefix also applies to other routing protocols such as OSI Routing, call routing in telephone networks, and to string matching problems.

20 Claims, 10 Drawing Sheets

| | Prefix | Link |
|---|---|---|
| P1 | 01* | L1 |
| P2 | 1* | L2 |
| P3 | 10* | L3 |
| P4 | 101 * | L2 |
| P5 | 100 * | L6 |
| P6 | 10111 * | L2 |

| Old Prefix | New Prefix | Link |
|---|---|---|
| P2 | 110* | L2 |
| P2 | 111* | L2 |
| P1 | 010* | L1 |
| P1 | 011* | L1 |
| P4 | 101* | L2 |
| P5 | 100* | L6 |
| P6 | 101110* | L7 |
| P6 | 101111* | L7 |

| Destination | Link |
|---|---|
| USA.CA.SF | L2 |
| USA | L1 |
| USA.CA | L3 |
| USA.MA.Boston | L2 |

| | Prefix | Link |
|---|---|---|
| P1 | 01* | L1 |
| P2 | 1* | L2 |
| P3 | 10* | L3 |
| P4 | 101 * | L2 |
| P5 | 100 * | L6 |
| P6 | 10111 * | L2 |

| Length 1 | 1*  L2 | |
|---|---|---|
| Length 2 | 10* L3 | 01* L1 |
| Length 3 | 101* L2 | 100* L2 |
| Length 5 | 10111* L7 | |

| Old Prefix | New Prefix | Link |
|---|---|---|
| P2 | 110* | L2 |
| P2 | 111* | L2 |
| P1 | 010* | L1 |
| P1 | 011* | L1 |
| P4 | 101* | L2 |
| P5 | 100* | L6 |
| P6 | 101110* | L7 |
| P6 | 101111* | L7 |

METHOD AND APPARATUS FOR FAST HIERARCHICAL ADDRESS LOOKUP USING CONTROLLED EXPANSION OF PREFIXES

BACKGROUND OF THE INVENTION

The Internet is becoming ubiquitous: everyone wants to join in. Statistics show that the number of computers on the internet is tripling approximately every two years. Traffic on the Internet is also increasing exponentially. Traffic increase can be traced not only to increased hosts, but also to new applications (e.g., the Web, video conferencing, remote imaging) which have higher bandwidth needs than traditional applications. One can only expect further increases in users, computers, and traffic. The possibility of a global Internet with multiple addresses per user (e.g., each user may have several appliances on the Internet) has necessitated a transition from the older Internet routing protocol (called IPv4, with small 32 bit addresses) to the proposed next generation protocol (called IPv6, with much larger 128 bit addresses).

The increasing traffic demand placed on the network forces two key factors to keep pace: first, the speed of communication links; and second, the rate at which routers (routers are boxes that route messages in the Internet, very much like automated Post Offices in the postal network) can forward messages. With the advent of fiber optic links, it is easily and economically possible to solve the first problem. For example, MCI is currently upgrading its Internet backbone links from 45 Mbits/s to 155 Mbits/s, and they plan to switch to 622 Mbits/s within a year. However, improving the speed of communication links is insufficient unless router forwarding speeds increase proportionately.

Today's fastest routers forward messages at a maximum rate of 100,000 to 500,000 messages a second. However, communication link speeds are already reaching speeds of 1 Gigabit/sec (1 Gigabit=1000 million bits per second). A router has to forward 5 million messages (of average size say 200 bits) per second to keep up with the speed of a Gigabit link. With the popularity of the Internet and the larger traffic volumes expected, router vendors wish to increase the forwarding performance of their routers.

The major problem that routers face in forwarding an Internet message is something known as address lookup. To understand this, we must first have an intuitive idea of what a router does. Consider a hypothetical fragment of the Internet linking users in Europe with users in the United States. Consider a source user (see label called Source in the left of FIG. 1) in Paris. If this user wishes to send say an email message to San Francisco, the user will send its message to a router R1 which is, say, in Paris. The Paris router may send this message on the communication link L4 to router R, say in London. The London Router R may then send the message on link L2 to router R3 in San Francisco; R3 then sends the message to the destination.

Notice how a message travels from source to destination alternating between communication links and routers. This is almost identical to the way a postal letter travels from post office to post office using some communication channel (e.g., an airplane). How does each post office decide where to forward the letter? Each post office does so, using the destination address that is placed on the envelope containing the letter. In the same way, routers must decide to forward a message based on a destination address that is placed in an easily accessible portion of the message called a header.

With this context, we can understand how a router forwards an incoming message. Consider the router R in FIG. 1. We show a schematic description of router R in FIG. 2. When a message arrives on say link L4, the message carries its destination address (San Francisco) in its message header. Router R is a special computer whose job is to forward all messages that are sent to it towards their final destinations. To do so, router R consults a Forwarding Table (sometimes also called a Forwarding Database). This is a table in the memory of R, which lists each possible destination and the corresponding output link. Note that the Forwarding Table contents are consistent with FIG. 1.

Thus when a message to San Francisco arrives on Link L4, router R looks up the destination address San Francisco in its forwarding table. Since the table says L2, the router then switches the entire message to the output link L2. It then proceeds to service the next arriving message. Notice that so far the word "lookup" is no different from looking up a word in a dictionary or a phone number in the phone book. We will show it is more difficult than dictionary or phone book lookup shortly.

Thus the two main functions of a router are to lookup destination addresses (address lookup) and then to send the packet to the right output link (message switching). To be more precise, there are some additional chores such as incrementing a visit count in a message; but these chores are fairly trivial compared to lookup and switching. Both must be done at very high speeds. Fortunately, the problem of message switching is very well understood in recent years because of advances in ATM Switching Technology. Economical gigabit message switching is quite feasible today because of the work of others. (Thus one can imagine a router as having an ATM core to switch packets.)

We have already seen that of the two main functions of a router, message switching is a solved problem and already available in many commercial products. Despite this, the problem of doing address lookups at Gigabit speeds remains. Current vendor speeds for lookups are quite slow. For example, existing products we know of use hardware assistance for lookups and can take up to 3 $\mu$s for a single lookup in the worst case and 1 $\mu$s on average. Our invention, on the other hand, gives ten times faster address lookup performance (lookups in around 0.1 $\mu$s).

Before we describe how our invention works, it is important to understand why Internet address lookup is hard. It is hard for two reasons. First, Internet addresses are not specially created (like ATM addresses) to be easy to lookup. Second, the Internet deals with scaling issues by using address prefixes which requires a more complex lookup. We describe details below.

First, looking up Internet addresses is a lot harder than say looking up ATM addresses. ATM addresses (VCIs) are carefully chosen to be simple to lookup in switch tables. Unfortunately, ATM addresses must be set up for each conversation which adds delay; by contrast, Internet addresses (like postal addresses) are relatively fixed and there is no additional set up delay per conversation. Secondly, ATM addresses do not currently make much provision for hierarchical networks and so are perceived not to be scalable to truly global networks. IP, through the use of prefixes (see below), has provision for scaling. Thus for various reasons, the Internet and ATM seem to be each going their own way. In the future, they are likely to coexist with ATM backbones and ATM LANs in the Internet. So, with respect to ATM, i) IP address lookup is a lot harder and ii) the Internet is unlikely, if at all, to change completely to ATM.

The second thing to realize is that the Internet lookup problem is a lot harder than looking up a phone number in a phone book, or a word in a dictionary. In those problems, we can search quite fast by first sorting all the words or names. Once sorted, if we are looking for a word starting with Sea, we can simply to the pages of S entries and then look for words starting with Sea etc. Clearly, such lookup is a lot faster than looking up all entries in a dictionary. In fact, such lookup is called exact matching lookup; standard solutions based on hashing and binary search provide very fast times for exact matching.

The Internet lookup problem is more difficult than dictionary search because Internet routers store address prefixes in their forwarding tables to reduce the size of their tables. However, the use of such address prefixes makes the lookup problem one of the longest matching prefix instead of exact matching. The longest matching prefix problem is a lot harder than the exact matching problem. Before we explain why, let us digress briefly and explain why routers store prefixes in their tables.

Consider FIG. 3. The situation is similar to that in FIG. 1. However, we show the geographic significance of the address more clearly. Router R has link L1 to get to Boston as before, but Boston is also the "hub" for the whole of the U.S. Assume that we can get to any destination in the U.S. from a hub router in Boston. As before link L3 leads to California, from where a message can be sent directly to any location in California. Finally, as before, link L2 leads directly to San Francisco.

If we were to use the naive database in FIG. 2, we would have to list every destination in the U.S. (possibly thousands) in the database. For example, we might list Denver, Kans., and other cities as being reachable through Boston on link L1. This would lead to an enormously large table in router R, which would be difficult to store and maintain.

Instead, we prefer to store prefixes in the modified database of FIG. 1. Notice that we now store all the destinations such as Denver, Kans. by the single entry USA.* (anything in the USA). We store California as USA.CA.* (anything in California), and San Francisco as USA.CA.SF. Thus we have used only three entries to store the same amount of information. Of course, to make this work we have to modify the destination address in a message from say San Francisco (see FIG. 2) to say USA.CA.SF. But this is easily done.

The use of prefixes introduces a new dimension to the lookup problem: multiple prefixes may match a given address. If a packet matches multiple prefixes, it is intuitive that the packet should be forwarded corresponding to the most specific prefix or longest prefix match. Thus a packet addressed to USA.CA.SF matches the USA*., USA.CA.*, and the USA.CA.SF entries. Intuitively, it should be sent to L2 corresponding to the most specific match USA.CA.SF. This is because (see FIG. 3) we have a direct line to San Francisco and want to use it in the place of possibly longer routing through Boston. Similarly a packet addressed to USA.CA.LA matches the USA* and USA.CA* entries. Intuitively, it should be sent to L3 corresponding to the most specific match USA.CA.*.

In summary, routers obtain massive savings in table size by summarizing several address entries by using a single prefix entry. Unfortunately, this leads to possibly multiple prefixes matching a given address, with the result that routers must solve a harder problem called best matching prefix.

With this interlude behind us, we can define the Internet address lookup problem. First, Internet addresses are strings of bits, not words using English characters, as we used above for the sake of illustration. A bit is either a 0 or 1. A bit string is a sequence of bits like 0101. The length of a bit string is the number of bits it contains. Thus the length of bit string 0101 is 4. Internet addresses come in two flavors. The current Internet (sometimes called IPv4, for Internet Protocol, version 4) uses addresses that are bit strings of length 32. We often say that IPv4 uses 32 bit addresses. The Internet is expected to evolve to a next generation Internet (sometimes called IPv6, for Internet Protocol, version 6) which uses 128 bit addresses. As we will see, the longer length of IPv6 addresses will only compound the problems of routers.

Except for this minor difference (bit strings instead of character strings), the Internet lookup problem is exactly the best matching prefix problem described above. To make things more concrete, consider the forwarding table of Internet address prefixes shown in FIG. 6. Except for the fact that we use bit strings (and we have labeled the prefixes for convenience), the situation is identical to the table in FIG. 4.

Now suppose we have a 32 bit IPv4 destination address whose first 6 bits are 10101. Clearly its best matching prefix is Prefix P4 though it also matches Prefix P3 and P2. Thus any message to such a destination address should be sent to the output link corresponding to P4, which is L2. The naivest method to solve the best matching prefix problem is to scan the entire forwarding table looking for the best matching prefix of an address. This would be grossly inefficient for large tables. We now describe two standard prior art solutions that attempt to solve the IP matching prefix. The first solution is based on converting the best matching prefix problem into an exact match problem. The second solution is based on using a data structure called a trie. We will see that both solutions examine a destination address one bit at a time, and hence can take up to 32 steps for IPv4 (and 128 for IPv6). This can be too slow. Later, we will describe our invention for processing IP addresses in larger steps (which we call strides). From now, we will describe all schemes with respect to IPv4 (32 bit) addresses unless we specifically generalize to include IPv6.

In this standard solution from the prior art, we divide the forwarding table into several (at most 32) separate forwarding tables such that Table i contains all prefixes of length i. Thus, if we redraw the forwarding table of FIG. 5 using this idea, we get FIG. 6. Notice that prefix 1* is in the Length 1 table, Prefixes 10* and 01* are in the Length 2 table, and so on. We have simply separated prefixes into separate tables according to prefix length.

The idea now is to start trying to find the longest prefix possible starting with the longest length prefix table and work backwards until we find a prefix table that we get a match on. So consider an address A whose first 5 bits are 10100. Since our longest prefix length is 5, we first try for a 5 bit match. We take the first 5 bits of address A (i.e., 10100) and use any technique for exact matching to match these first 5 bits of address A against any prefix in the Length 5 database. A good technique to use for this is hashing. Since we fail to find a match, we move to the next length table (Length 3). This time we take the first 3 bits of address A (i.e., 101) and we search the Length 3 Table (see FIG. 6). This time we get a match and we see that the best matching prefix is 101* and the output link is L2.

This method can cost up to 32 exact matches (often done using hashing in software) for IPv4 and 128 exact matches for IPv6. (To see this consider an address that matches a 1 bit prefix, in a table that contains prefixes of all possible lengths). An example of a patent that does this is U.S. Pat. No. 549,517 by Mullan et al. This is often too time consuming in software. Another patent proposes doing all the exact matches in parallel using hardware. Each exact match is done using a Context Addressable Memory (CAM). Unfortunately, the hardware cost of this solution is also formidable as we have to use 32 CAMs for IPv4 (128 for v6); each CAM is expensive. Other methods have proposed pipelining the CAMs instead of doing the searches in parallel. However, this prior art solution has not been met with great commercial acceptance.

Another prior art solution is based on the use of tries. A trie is a data structure which allows us to search IP addresses a bit at a time, as in FIG. 6, but to do so incrementally. A trie is a tree of nodes, each note containing a table of pointers. The standard solutions for IPv4 (e.g., the solution used in the Berkeley UNIX software) uses binary tries, in which each trie node is a table consisting of two pointers.

An example will explain how tries work. Consider FIG. 7. The root node is shown on the top left. Each trie node is a table whose topmost entry can contain a prefix. Each table also can contain two pointers, each of which points to other trie nodes (FIG. 7) or to prefixes. This trie stores the same table as in FIG. 5. The root node (top left) has two pointers. The first pointer, corresponding to the value '0', points to a subtrie that contains all prefixes that start with '0'. Since there is only one such prefix, i.e., P1, the '0' pointer points directly to P1. On the other hand, all five other prefixes begin with '1'. Thus the '1' pointer in the root node, points to a subtrie that contains the 5 prefixes.

Each subtrie is a smaller trie with a smaller number of prefixes. In addition to pointers, each node may also have a stored prefix P. Define the path of a trie node N to be the sequence of bits corresponding to the pointers used to reach N starting from the root. Thus in FIG. 7, the path of Node 1 is 1; the path of Node 2 is 10, and the path of Node 3 is 101. We store a prefix P inside node N if the path of node N is equal to prefix P, ignoring the * character. Thus in FIG. 76, we see that Node 1 stores P2=1*, Node 2 stores P3=10*, and Node 3 stores P4=101*.

Next, for each node N, the '0' pointer points to a subtrie of prefixes that begin with the Path of Node N followed by a '0'. The '1' pointer points to all prefixes that begin with the Path of Node N followed by a '1'. Thus, Node 1 has a '0' pointer that points to a subtrie that contains all prefixes that start with the Path to Node 1 (i.e., 1), in other words all prefixes that start with 10. Thus Node 1's 0 pointer points to a subtrie that contains P5 (100*), P3 (10*), P4 (101*), and P6 (10111*). Node 1's '1' pointer does not point anywhere because there is no prefix that starts with 11.

Similarly, Node 2's Path is 10. Thus Node 2 has P3 stored internally (P3=10*). Also, the '0' pointer of P3 points to all prefixes that begin with 100. Since the only such prefix is P5=100*, the '0' pointer of Node 2 points to P5. Similarly, the '1' pointer in Node 2 points to all prefixes that start with 101. Finally, Node 3's Path is 101. Thus P4=101* is stored at Node 3, and Node 3's 1 pointer points to all prefixes that start with 1011, of which the only such prefix is P6.

Now consider searching the trie table for the best matching prefix corresponding to an address A whose first 6 bits are 101011. We use the bits of an address, starting with the leftmost bit, to follow a path through the trie. We always begin at the root node. Since the first bit of A is 1, we follow the '1' pointer to Node 1. Since Node 1 contains a prefix, P1, we remember this as a possible matching prefix. Then, since the second bit of A is 0, we follow the '0' pointer to Node 2. Once again, since node 2 contains a prefix, P3, we remember this as the longest prefix we have seen so far on the path.

Next, since the third bit of A is 1, we follow the '1' pointer at Node 2 to Node 3. Once again, since Node 3 contains a prefix, P4, we remember P4 as the longest matching prefix seen so far. Finally, since the fourth bit of A is a '0', we try to follow the '0' pointer at Node 3. At this point our trip through the trie stops because there is no '0' pointer at Node 3. When this happens we conclude that the best matching prefix for address A is P4. In actual practice, in every place a prefix is stored in FIG. 7, we would also store the corresponding output link as in FIG. 6 and FIG. 5. We have just omitted output links for the sake of simplicity.

Thus, to find a best match prefix in a trie, we use successive bits of the address to trade a path through the trie, starting from the root, until we fail to find a pointer or we end at a prefix. As we walk through the trie, we remember the last prefix we saw at a previous node, if any. When we fail to find a pointer, this is the best matching prefix.

As a second example of a search that ends with a prefix, consider searching for an address B whose first three bits are 100. We go from the root to Node 1 to Node 2 and then follow the '0' pointer to prefix P5 which is the best matching prefix.

The worst case time to walk through a trie path is the maximum number of nodes in a trie path. If we have the sequence of prefixes 1*, 11*, 111*,, 111*, etc. then we can easily have a trie path equal to the maximum address length (32 for IPv4, 128 for IPv6). Thus the time for trie search of an address can be as bad as following 32 (or 128 for V6) pointers. This is somewhat better than the 32 exact matches required in FIG. 6, but it is still slow for real routers. The problem is that the following of each pointer requires at least one READ of memory. The fastest reads to reasonably inexpensive memory take about 0.06 $\mu$sec. Thus 32 READs take about 1.7 $\mu$sec, which is the fastest that routers can do today.

A description of Tries can be found in the textbook called "Fundamental Algorithms, Sorting and Searching, by Donald Knuth, Addison Wesley, 1973". A description of a particular kind of trie (called a Patricia trie, and which is optimized to reduce storage) applied to Internet lookups can be found in Keith Sklower. A tree-based routing table for berkeley unix. Technical report, University of California, Berkeley and in W. Richard Stevens and Gary R. Wright. *TCP/IP Illustrated, Volume 2 The Implementation.* Addison-Wesley, 1995. H. Wilkinson, G. Varghese and N. Poole, Compressed Prefix Matching Database Searching, U.S. patent application Ser. No. 07/378,718, December 89. Issued in Australia as Patent 620994 describes another variant of tries that reduces storage using a technique called path compression. All the existing trie schemes assume that trie search must be performed 1 bit at a time if the prefixes can be of arbitrary length. This greatly slows down trie search as it requires W memory READS, where W is the size of a destination address.

Trie search that searches multiple bits at a time is described in Tong-Bi Pei and Charles Zukowski. Putting routing tables in silicon. *IEEE Network Magazine*, January 1992. However, this work only applies to exact matching and not to prefix matching. The work in U.S. Pat. No. 5,414,704 by Spinney applies only to exact matching and not to prefix matching. Radia Perlman. *Interconnections, Bridges and Routers.* Addison-Wesley, 1992 describes a method based on binary search. Unfortunately binary search takes time proportional to the logarithm of the number of entries. For a typical router database of 30,000 entries this takes 13 READs to memory which is too slow. The work in U.S. Pat. No. 5,261,090 applies to range checking which is a similar problem but also uses binary search.

SUMMARY OF THE INVENTION

Our new invention addresses the slow lookup times of all previous schemes by reducing the number of distinct prefix lengths to be considered. Before we describe out invention, we describe why the IP address problem can be considerably simpler, if prefixes do not have arbitrary length but have lengths that are multiples of say x, where x>1. If this assumption is true, we will show that we can search through IP address x bits at a time, which is faster. However, real IP prefixes have arbitrary lengths. The essence of our new idea is to reduce the problem of searching for arbitrary length IP addresses to the simpler problem of search IP addresses that are a multiple of x, for x>1.

Suppose we had a forwarding table such that all prefix lengths were multiples of 4. In other words, we only had prefix lengths that were either 0, 4, 8, 12, 16, 20, 24, 28, or 32 for IPv4. Then, if we return to the standard scheme in Section 3.1 it is easy to see that since we only have 8 distinct prefix lengths, that we only have to do at most 8 exact matches. In general, if the prefix lengths are multiples of x, and L is the length of an address, we only need to do L/x exact matches. This is a big savings: if x=4, we can go 4 times faster. In general, if we had only n distinct prefix lengths, $L_1, L_2, \ldots, L_n$, we only need n exact matches.

Similarly, in the case of trie search, if all prefix lengths are multiples of say 4, then we can stop doing trie search 1 bit at a time, and do trie search 4 bits at a time! All the trie nodes will now have 16 pointers, corresponding to all possible values of 4 bits. Except for this change, the trie search algorithm remains unchanged. Notice that this works only because prefix lengths are multiples of 4, and so we will not "miss" any prefixes by walking the trie in larger strides of 4 units. In general, if we walk a trie x bits at a time, it is easy to see that the worst case time is cut down to L/x, as opposed to L. (Recall that L is the length of the address).

The fact that restricted prefix lengths leads to a faster search is well known. For example, OSI (another world standard routing protocol that is still popular in parts of the world) uses prefixes just as in IP, but the prefix lengths are always multiples of 4. It was well known that trie search of OSI addresses could proceed in strides of length 4, but only in those instances where the prefix was controlled to be a certain length, and we are not aware of any prior art scheme for adapting arbitrary length prefixes to prefixes whose lengths belong to a set of preselected lengths.

We now come to the present invention. We just saw that if we could restrict IP prefix lengths we could get faster search. But it is well known that real IP prefix lengths are nearly arbitrary. Typical backbone routers contain all prefix lengths from 2 to 32! Thus prefix lengths are almost arbitrary. A central feature of our invention is to reduce a set of arbitrary length prefixes to a predefined set of lengths using a technique that we call controlled prefix expansion.

Suppose we want to only deal with prefixes that are multiples of 3 in FIG. 5. How can we handle a prefix like P3=10* that is of length 2. The solution is to expand the prefix P3 into multiple prefixes of length 3 that are equivalent to the original prefix P3. This is easy if we see that 10* represents all addresses that start with 10. Clearly of these addresses, some will start with 101 and the rest will start with 100. Thus, the prefix 10* (of length 2) is equivalent to the union of the two prefixes 101* and 100* (both of length 3). In the same way, we can easily expand any prefix of any length m into multiple prefixes of length n>m. For example, we can expand 10* into four prefixes of length 4 (1000*, 1001*, 1010*, 1011*). Of course, if n gets much bigger than m, we may have to add a large number of prefixes.

The previous paragraph talked about prefix expansion. We now describe an accompanying concept called prefix capture. Suppose we have the two prefixes P3=10* and P4=101* as in FIG. 5. Suppose we want to work in units of length 3. Then, as in the last paragraph, we would expand P3 into the two prefixes 101* and 100*. But we already have the prefix P4=101*. Since we clearly do not want multiple copies of the same prefix, we must pick one of them. It is easy to see that when P3 and P4 overlap, P4 is the more specific prefix. Thus when a lower length prefix is expanded in length and one of its expansions "collides" with an existing prefix of higher length, then we say that the existing prefix captures the expansion prefix. When that happens, we simply get rid of the expansion prefix. For example, we would get rid of the expansion 101* corresponding to 10*, because it is captured by the existing prefix P4=101*.

Thus the concept of controlled address expansion is a combination of the two concepts of prefix expansion and prefix capture. With this in place, we can reduce any set of arbitrary length prefixes into an expanded set of addresses of any prespecified length $L_1, L_2, \ldots, L_n$. Notice that this includes making lengths multiples of a number such a 3. But it also includes the case when the target lengths are not multiples of each other such as 1, 5, 11, and 21. In this case, we will expand an arbitrary length (e.g., 9) into the next highest length (e.g., 11) found in the target set.

EXAMPLE

We show how controlled prefix expansion will work in the case of the IP address database shown in FIG. 5. Thus the original database has 4 distinct prefix lengths: 1, 2, 3, and 4. We will reduce the number of distinct prefix lengths to be multiples of 3 (i.e., only 3 and 6) using controlled address expansion.

We start by expanding the lowest length prefix P2=1*. We first expand it to length 2 into the two prefixes 10* and 11*. Since 10* is captured by P3=10*, we are left only with 11*. We expand 11* further (since it is not a multiple of 3) to 110* and 111*. Since both these prefixes inherit the same output link (L2) as P2, we place these new prefixes in the first two entries of the new forwarding table shown in FIG. 8.

Next, we expand prefix P1=01* into the two prefixes 010* and 011*, both of which inherit the same output link L1 from P1. These form the third and fourth rows of FIG. 8. We then expand prefix P3=10* into the two prefixes 100* and 101*. However, 101* is captured by P4=101*, and 100* is captured by P5=100*, and so we completely remove P3 from the database! Next, the old prefixes P4 and P5 remain unchanged as they are already of length 3. Finally, we expand the old prefix P6 (of length 5) into two prefixes of length 6 as shown in FIG. 8.

In general, the controlled prefix expansion can be used to improve performance of any scheme that does best matching prefix x bits at a time, by doing the same scheme y>x bits at a time. We say that our invention allows us to process strings in strides that are larger than the natural stride defined by the problem.

In particular, for IP forwarding, we can improve the performance of schemes that process IP addresses one bit at a time, to do so y>1 bits at a time. In our experiments we have used y=8. We found (using a typical router database) that with reasonable amounts of memory, we were able to speed up lookup performance by a factor of 10.

Even for the OSI routing scheme alluded to earlier, where the natural stride is 4 (since all prefixes are multiples of 4), we can use a stride of 8, potentially doubling performance. If we apply the scheme of Section 3.1 to the expanded database of FIG. 8, the four tables in FIG. 6 will reduce to two tables (although each table has more entries). Thus we will need only two exact matches instead of four. Since many exact matching techniques like hashing are independent of the number of entries in each table, this can be advantageous.

In general, if we use a stride of y, we will reduce the number of exact matches by up to a factor of y. Even in the hardware version, this will reduce the number of Content Addressable Memories by a factor of y, which will save cost (as opposed to time).

The trie corresponding to the expanded database in FIG. 8 is shown in FIG. 9. Notice how the worst case path length has now reduced to 2. Consider, as an example, a search for address I whose first 6 bits are 101011. In FIG. 9, we use the first 3 bits of A (101) and follow the pointer corresponding to 101 to the second trie node.

At the second trie node, we see that we have a valid prefix in the node itself (i.e. P4) and remember that. Then we try to follow the pointer corresponding to the next three bits of A (i.e., 011) and fail. The best prefix we have encountered on the path so far is P4 which is the right answer.

Thus, trie search continues to be similar. We use the bits in an address to trace a path through the trie until we either fail or reach a valid prefix. We also remember the longest prefix encountered in the path so far in case of failure. The only difference from the case of 1 bits, is that we consider y>1 (in this example y=3) bits a time.

This can be generalized to using different size trie nodes at each level. For example, we could use 16 bits at the first level, 8 at the second level, and 4 at the next level.

One problem with FIG. 9 is that we have to do two READs to memory for each visit to a trie node, one to read any possible prefix stored at the node, and one to read the pointer we are following. This can be remedied as follows. We store any prefix associated with a node along with the pointer leading to the node. This is shown in FIG. 10.

For example, in FIG. 10 the prefix 101* (P4) is now stored next to the pointer corresponding to 101 (as opposed to being stored in the lower node in FIG. 9. Essentially, we hoist prefixes upwards from a node to the pointer leading to the node. If we now combine the Pointer and BestPrefix fields into one memory word (easily possible on a 32 or 64 bit computer because both can be implemented as 16 bit pointers) then the two fields can be read with one memory access. While the principal advantages and features of the present invention have been briefly described, a more complete understanding may be attained by referring to the drawings and reading the description of the preferred embodiment which follow.

DETAILED DESCRIPTION OF THE PREFERRED EMBODIMENT

We first describe the working of a router. An important part of the router process of forwarding a message is the problem of destination address lookup in a forwarding table of address prefixes. We then describe our invention, which shows how to provide faster address lookups, in two parts. We show how to expand the original set of prefixes (potentially of arbitrary length) into prefixes whose lengths are multiples of a specified stride length. Once this process (called controlled expansion) is done, we can use any existing method of building and looking up prefixes that will produce faster lookups because of the reduced number of prefix lengths. We will describe the specific algorithm for our preferred embodiment using tries; the reduced prefix length will dramatically reduce the worst-case path of trie lookup, and hence dramatically improve the lookup speed. We also briefly describe how this could be applied to a second embodiment that relies on sequential (or parallel) exact matching of all possible prefixes of a destination address.

Figure 11:
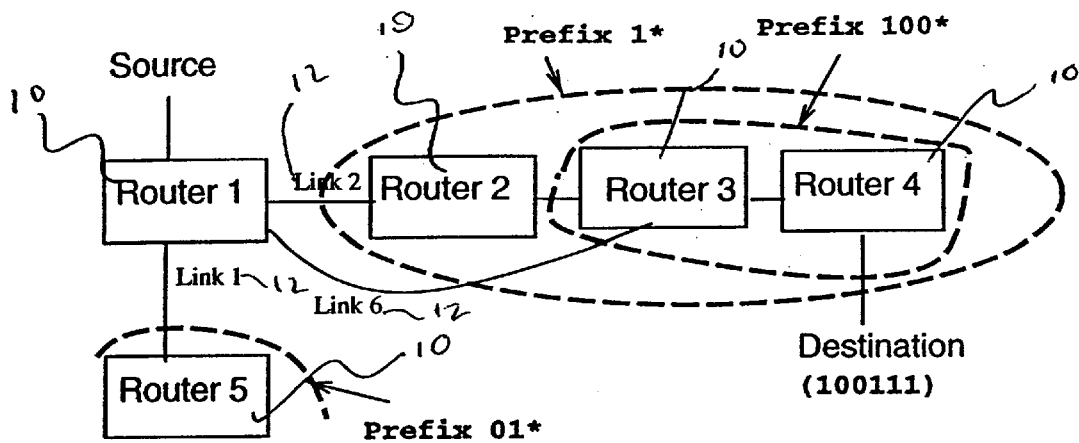
FIG. 11 is a schematic diagram of a typical data communication or telephone network that uses prefixes.

Although our invention can be used in other contexts for doing fast best matching prefix, we describe our invention in the context of a communication network that is used to forward messages (e.g., the Internet) or calls (e.g., telephone network). FIG. 11 shows an example data communication network. It consists of devices called Routers (10) connected by communications links (12). Communication links include links such as fiber optic links, Ethernet links (which can connect more than one router), satellite links, etc. that allow a message to be sent directly between two routers. In case of a telephone network, the situation is similar except that messages are replaced by telephone calls and routers are often referred to as telephone switches. For the rest of this description, we will use the data communication network terminology.

Figure 12:
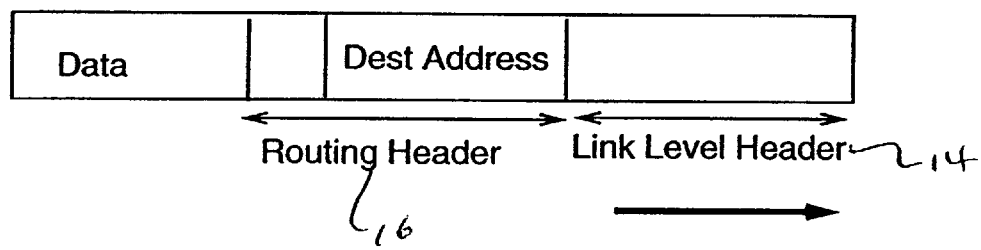
FIG. 12 is a schematic diagram of a message header with routing destination address.

The main function of a communication network is to route messages (sometimes called packets in data communications) sent by any source to any specified destination. FIG. 12 shows the format of a message sent by the source to a destination. The front of the message contains a link level header (14), followed by a routing header (16) that is examined by routers. The routing header (16) contains the destination address of the intended recipient, typically encoded as a binary number. The routing header (16) also contains other fields such as a visit count and other fields that vary in different routing protocols.

Routers forward messages by looking up the message destination address in a Forwarding Table to determine the output link, and then forwarding the message to the corresponding output link. In order to reduce the size of Forwarding Tables, the Forwarding Table may consist of prefixes. A prefix represents a group of destinations whose addresses all being with that prefix. For example, in FIG. 11, Routers 2, 3 and 4 and the destinations they serve are described by Prefix 1*. Prefixes may be nested within other prefixes. In FIG. 11, Routers 3 and 4 can reach the prefix 100*, which is contained in the group covered by prefix 1*.

The router forwarding table will store the corresponding output link to reach every prefix that it knows about (this information is obtained using various routing update protocols). For example, Router 1 will contain an entry which says that Prefix 1* is reachable through Link 2, and Prefix 100* is reachable through Link 6 (see FIG. 11).

To forward a message (with destination address say 100100), the router must lookup its forwarding table for any prefixes that match the destination address in the message. If more than one prefix match, the router picks the prefix that has the longest match. For example, in forwarding a message to 100100, this address matches both 100* and 1*; however, 100* is the more specific match, and so the message must be sent to Link 6. Note that FIG. 11 is only an extremely simple example of a routing network or internetwork; our invention clearly applies to other networks built along similar principles that use longest matching prefix forwarding.

We can now describe the workings of a router (e.g., Router 1 in FIG. 11). A router (FIG. 13) consists of Input Links 1 through m, and corresponding output links 1 through n (in most cases, a router has the same number of input and output links but not always). Corresponding to each input link there is a link interface (L1 through Lm) and corresponding to each output link there is a link interface (O1 through On). Each link interface contains the circuitry to send and receive messages on a particular link, and (possibly) buffers to store messages temporarily before they are forwarded.

Figure 13:
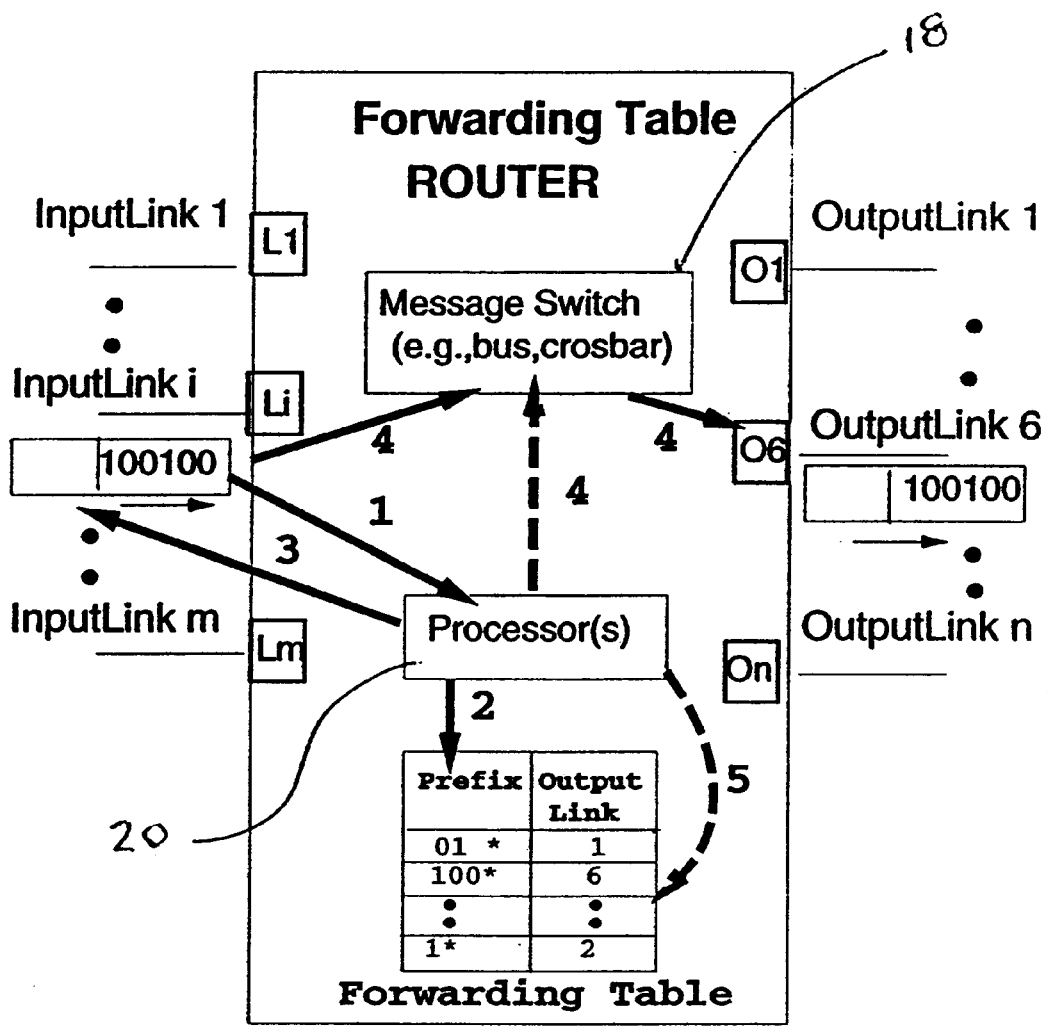
FIG. 13 is a schematic diagram of a router.

The two other main components of a router are a message switch subsystem 18 and a processing subsystem 20 (see FIG. 13). The processing subsystem 20 could be a single processor, group of processors, a processor per link, or various hardware state machines. The message switch subsystem 18 is responsible for switching a message from an input link interface to an output link interface under command from the processing subsystem. Typical message switch subsystems contain one or more computer busses, a crossbar switch, or more sophisticated switching systems. In some routers the switching subsystem function is performed by one of the processors; in some cases, it is done by independent hardware.

The typical algorithm for forwarding a message is as follows. When a message arrives at say Input Link i, it is stored in the corresponding link interface. Some time later, a processor in the processing subsystem reads the destination address (1 in FIG. 13), then does an address lookup (2). The result of the address lookup specifies the output link corresponding to the longest prefix match. Some fields in the message are then (3) updated (e.g., often a visit count is incremented and the link headers are sometimes updated). Finally the message is switched (4) to the specified output link. This is done by the CPU specifying the details of the message, input and output links to the switching subsystem (shown by dotted arrow labeled 4). The switching subsystem then actually transfers the message (shown by solid arrows labeled 4).

For example, a message sent to destination address 100100 in FIG. 13 is matched to prefix 100* and is switched to output Link 6. Returning to FIG. 11, it will be appreciated that a message from the source to the destination, is sent by having each router in the path do a similar algorithm.

Finally, in FIG. 13, we have one more function performed by a router. Periodically, when the router gets new routing updates from other routers, the router may rebuild its forwarding table to add or delete some prefixes (5).

Our invention relates to a novel method of preprocessing prefixes in (5) in order to make the lookup (2) an order of magnitude faster. We now describe this.

Figure 14:
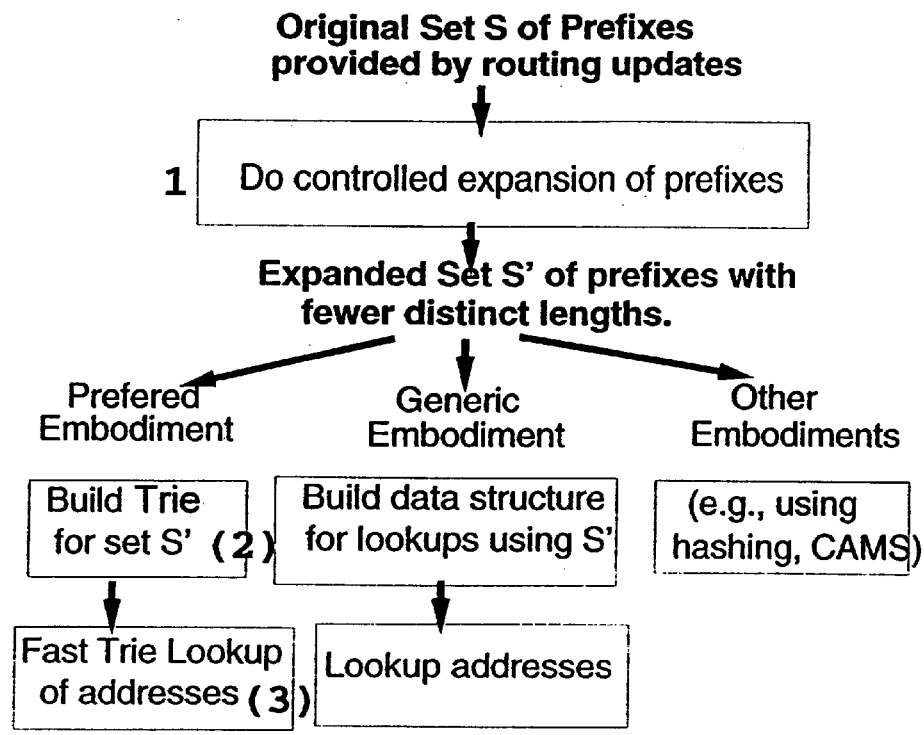
FIG. 14 is a flow chart illustrating implementation of the present invention in various embodiments.

FIG. 14 shows the organization of the controlled expansion approach to providing faster longest matching prefix lookups. This includes both the step of table building (5 in FIG. 13) and the step of address lookup (2 FIG. 13).

We start with a set of prefixes that the router receives from routing updates. Any standard textbook on routing (e.g., *Interconnections, Bridges and Routers* by Radia Perlman, Addison-Wesley, 1992) describes how routers receive information about prefixes from each other. Next, we (1 in FIG. 14) apply the Controlled Expansion Technique described, supra. This results in a set of prefixes with fewer distinct lengths. Next, in the generic embodiment, we can use any longest matching technique that benefits from the lower number of prefix lengths. The generic method must first build a table (done by the router when new updates are received) and then actually do lookups when messages are received. Our preferred embodiment (2,3) is to build a trie (2) and to do a fast trie search with pointer hoisting (3). We describe these two aspects in more detail after describing controlled expansion. We also can apply our technique to other embodiments such as hashing, as is well known and require no changes beyond what is known in the prior art (once controlled expansion of the present invention is applied).

We now describe the steps in the invention in more detail, starting with controlled expansion and then describing the trie build and lookup algorithms.

We first describe how to expand a set of prefixes of arbitrary lengths into prefixes that are multiples of a specified stride length X. In general, as we will see later, we can expand an arbitrary prefix to a set of prefixes whose lengths belong to a preselected set of lengths. However, for simplicity, the initial description will describe expansion for the special case when the preselected lengths are multiples of a fixed stride length.

We first choose the preselected lengths to minimize time and storage. For example, the smaller the number of preselected lengths the smaller the search time. Thus we might preselect prefix lengths that are multiples of 8 (8, 16, 24, 32) which can reduce the number of memory READs to 4. We could also choose multiples of 16 (e.g., 16, 32) to reduce the number of READs to 2 but that can increase the storage requirements by greatly increasing the number of expanded prefixes. A compromise is to use larger stride lengths initially and then smaller stride lengths. For example using the prespecified stride lengths 16, 24, 32 allows only 3 READs to memory and has reasonable storage needs. We assume in what follows that a router chooses the preselected stride lengths based on balancing storage and time requirements. The choice can be made either once by the software or periodically based on changing router needs.

Figure 15:
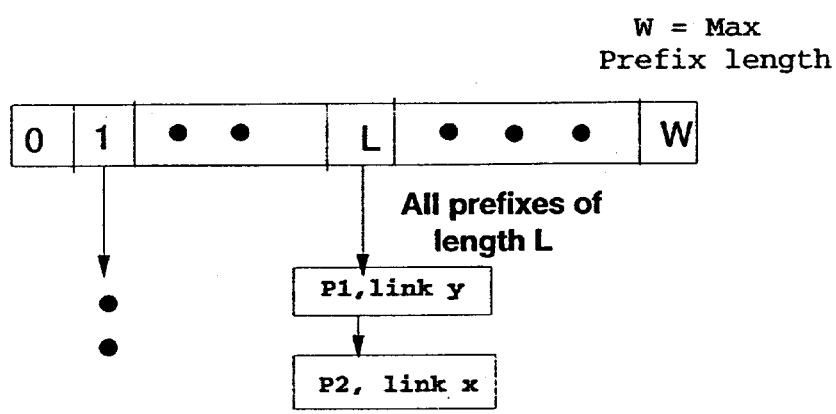
FIG. 15 is a table for illustrating the use of the expansion algorithm shown in FIG. 16.

Once the preselected prefix lengths are chosen, controlled expansion of prefixes is done using the data structure called Table shown in FIG. 15.

Figure 1:
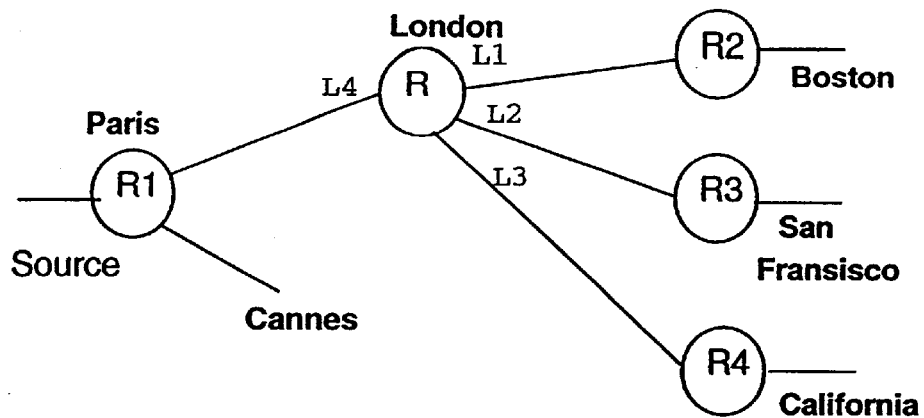
FIG. 1 is a schematic diagram of a hypothetical fragment of the internet linking users in France with users in the U.S.
Figure 2:
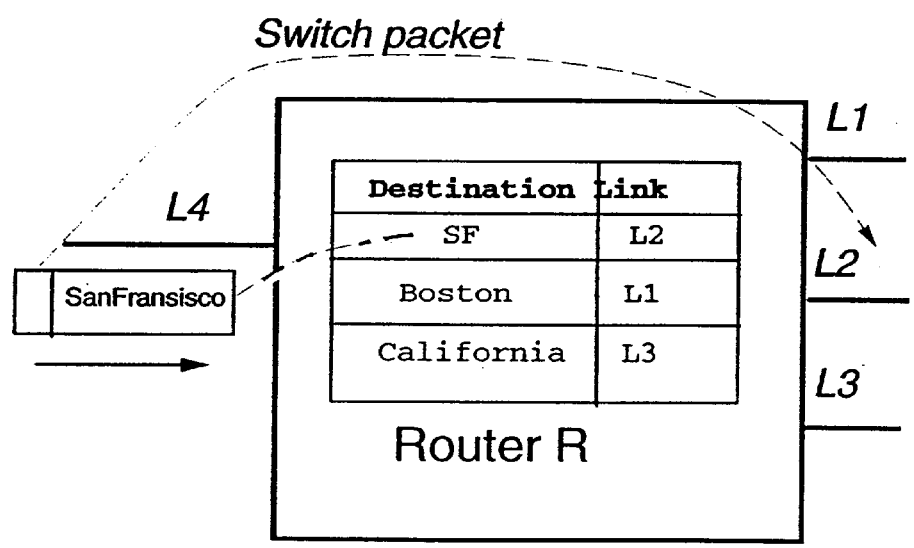
FIG. 2 is a schematic diagram of a router illustrating address lookup in a lookup table.
Figures 3, 4, 5, 6:
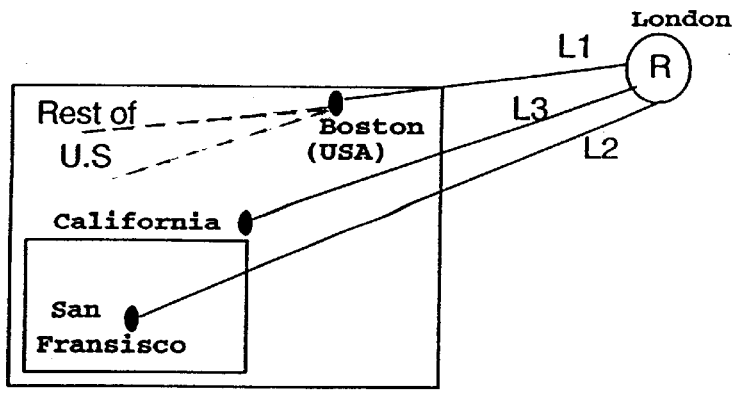
FIG. 3 is a reconfiguration of the internet fragment depicted in FIG. 1 illustrating different links resulting from different address prefixes.
FIG. 4 is a table detailing the modified database corresponding to FIG. 3.
FIG. 5 is a sample forwarding table of IP address prefixes.
FIG. 6 is a table illustrating a database that reduces prefix matching to exact matching.
Figures 7, 8:
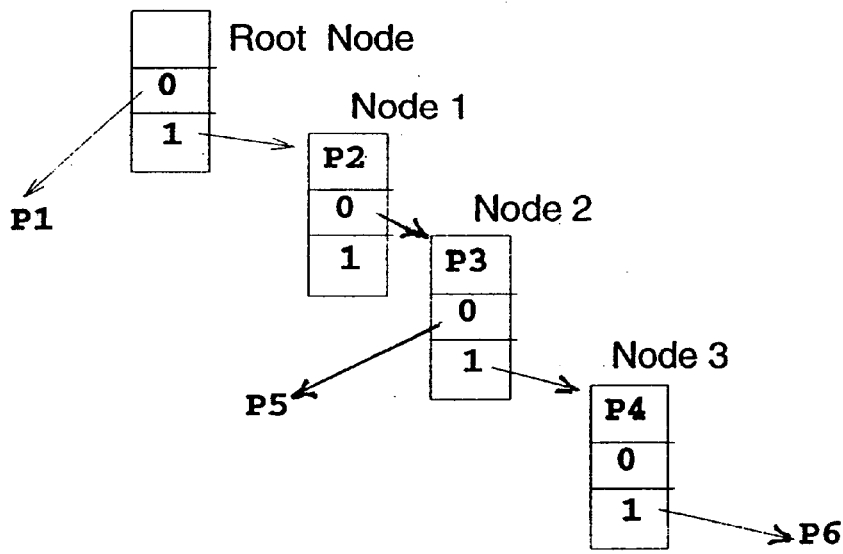
FIG. 7 is a schematic diagram of a trie node network constructed from the data in FIG. 5.
FIG. 8 is a table containing arbitrary prefixes expanded through controlled expansion from the prefixes of FIG. 5.

The algorithm starts with a list of (Prefix, Link) pairs (see for example the database shown in FIG. 5 and a stride length of X and outputs a list of equivalents (Prefix, Link) pairs except that all Prefix Lengths are multiples of the stride length X.

Figure 16:
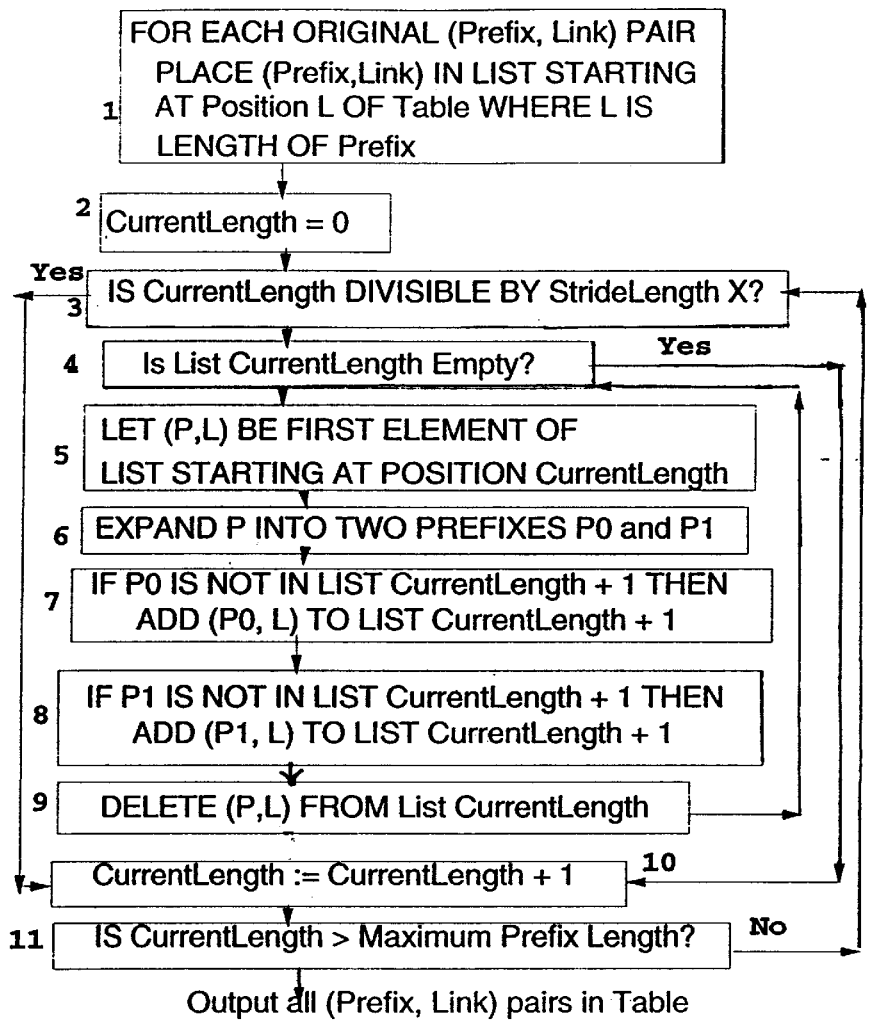
FIG. 16 is a flow chart of the software for controlled expansion of prefixes having arbitrary length into expanded prefixes of predetermined length.

The flow chart for this algorithm is shown in FIG. 16. It starts (1) by placing all the original (Prefix, Link) pairs in the Table according to the length of a prefix. If Prefix has length L, then the (Prefix, Link) pair is placed in a list that is pointed to by Position L of the Table. Essentially, we have sorted the prefixes by length.

The main loop of the algorithm scans the positions in the Table starting with length 0 and working up to the maximum prefix length (i.e., we scan the array in FIG. 15 from left to right). The 0 length prefix corresponds to a default route that is sometimes used. Each array position that is a multiple of X can be left untouched. Any array position that is not a multiple of X must be expanded. Instead of doing the complete expansion, we simply expand all L length prefixes to two prefixes of length L+1. If these expanded prefixes already exist (capture), then we do nothing; otherwise, we place them in the list corresponding to L+1. We do this for each element of the list until the list is exhausted. Finally, we move on to the next position in the Table.

In FIG. 16, the main loop begins (2) with setting CurrentLength equal to 0, where CurrentLength represents the current position in the scan through Table. Next, (3) we check whether CurrentLength is a multiple of the StrideLength. If so, we go to (10) where we increment CurrentLength and then check whether the main loop should continue (11). If CurrentLength is not a multiple of the StrideLength, we process the elements in the list CurrentLength. If the list in position CurrentLength is empty (4), we can go directly to (10). If not, we go to (5), where we begin the controlled expansion of the head of the list, say (P,L).

In (6), we expand P into two prefixes P0 and P1. In (7), we check whether P0 is already captured in the next higher position list; if not, we add it to the next higher position list. In (8), we do the same controlled expansion for P1. Finally, in (9), we delete (P,L) from the CurrentLength list and then return to process any more possible members of the same list in (4).

Finally, we terminate the main loop (11) where CurrentLength reaches the maximum prefix length (e.g., 32 for IPv4). At this point, the only prefixes left in the Table are multiples of the stride length, and can be read off from Table by scanning through the positions and reading the (Prefix, Link) pairs from any non-empty lists.

This algorithm can easily be adapted to arbitrary stride positions (instead of just multiples of X) by changing (3) to check whether CurrentLength is equal to one of the specified stride lengths. Thus we can easily adapt the algorithm to handle a variable size stride (e.g., 16, 24, 32 is a useful set of stride positions for IPv4 that allows exactly 3 memory accesses).

Incremental Expansion: If a single new prefix is added or deleted, then a less expensive algorithm can be used to incrementally compute the changes to the controlled expansion. Suppose a prefix P is added or deleted and P has length L and L is greater than iX and less than or equal to (i+1) X, for some multiple i of the stride length X. Then only prefixes in the original set of prefixes that have lengths that also lie between iX and (i+1) X are affected by this change. (Some of these original prefixes could, for example, be captured earlier by the addition of a new prefix.)

In a nutshell the incremental algorithm basically expands again all original prefixes that lie in this range. This results in a new set of prefixes of length (i+1)·X. We now compare this with the old set of prefixes of length (i+1)·X that existed before P was added (or deleted). Then when we go to Step 2 in FIG. 14, only these changed prefixes need to be incorporated into the new Table. These flow charts may be readily used by one of ordinary programming skill to program any processor of any router in any suitable language.

We have described how controlled expansion (either of the full Table or the incremental version) can result in a new set of prefixes to be added or deleted to whatever data structure we choose to do address lookups. We now describe how table building and address lookup are done for our preferred embodiment using tries.

Figure 17:
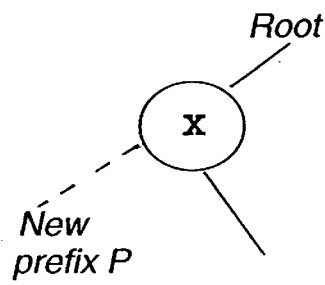
FIG. 17 is a schematic diagram illustrating the addition of a new prefix to a trie.

Adding (or deleting) a new prefix P from a trie is a standard operation that is well documented in the prior art (see Knuth, The Art of Computer Programming, for example). The basic idea for insertion is to do a search in the trie for the new prefix (FIG. 17) P and find the first node X at which this search fails. We then add a path of trie nodes (dotted lines in FIG. 17) that lead to the new prefix. Deletion is conceptually the reverse task, where we find the last branching node X and then delete the dotted portion. We omit details because this is available in the prior art.

Figure 19:
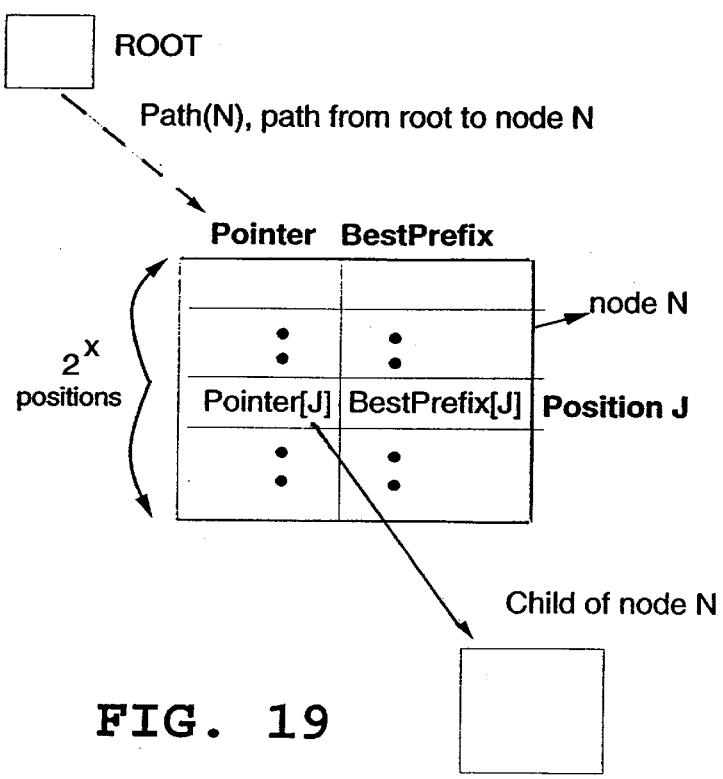
FIG. 19 is a schematic diagram of a trie for prefixes whose lengths are multiples of x.

The only difference between our trie and a standard trie is that our trie (see FIG. 10) has all prefixes hoisted to be stored along with the pointer that leads to the node corresponding to the prefix. We also have two fields associated with each position of every trie node, the Pointer and BestPrefix fields (FIG. 19).

Insertion into our modified trie can easily be done by first doing the standard algorithm for Insertion resulting in some final node N corresponding to P.

Suppose field Pointer[J] in some Node M points to node N. We then hoist the prefix P upwards to be stored in BestPrefix[J] of node M. We can then delete node N and set Pointer[J] to Nil. It should be clear that an actual implementation would not create note N only to delete it immediately: we describe it this way for brevity.

Figures 9, 10:
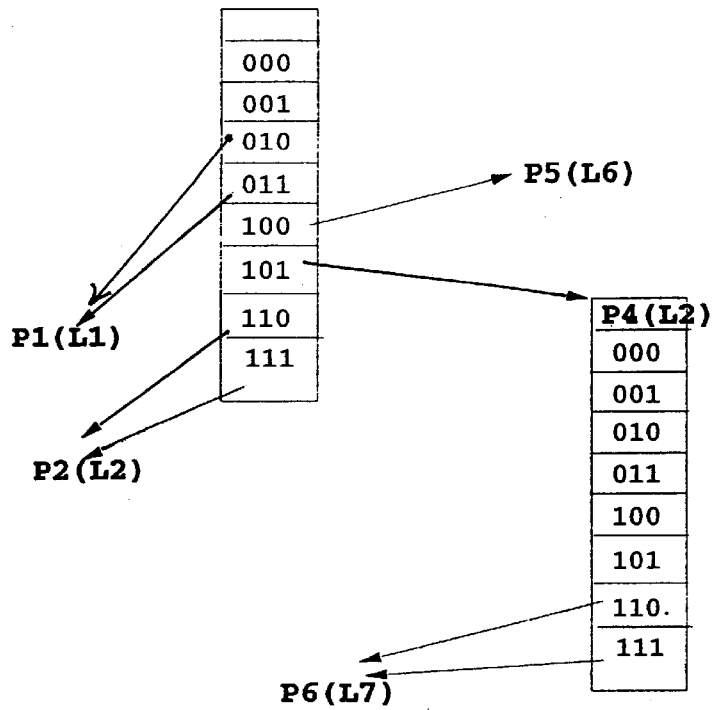
FIG. 9 is a schematic diagram of a trie corresponding to the expanded prefix database shown in FIG. 8.
FIG. 10 is a schematic diagram of a trie corresponding to the trie in FIG. 9 with prefixes hoisted for storage with their corresponding pointer.
Figure 18:
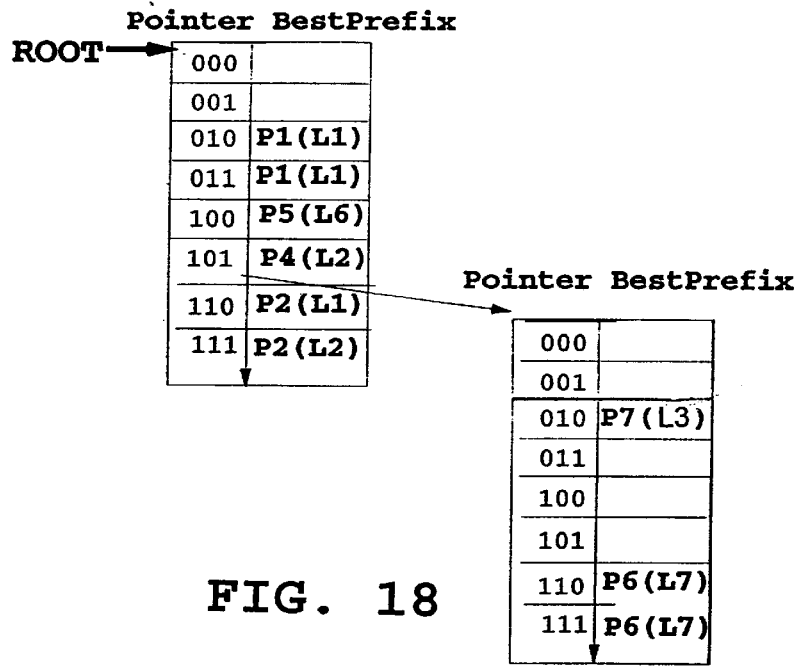
FIG. 18 is a schematic diagram of the trie of FIG. 10 after the addition of a new prefix.

FIG. 18 shows the database in FIG. 10 after the addition of the new prefix P7=101010 with corresponding output link L3. Notice first that P7 is already a multiple of the stride length (we assume in this example that the stride length is 3) and so there is no need for controlled expansion. We search from the Root of the trie for the new prefix P7=101010 and fail in the second trie node. We then update the BestPrefix field corresponding to entry 010 of the second node and we are done. This is shown in FIG. 18.

Once we expand all prefixes to the stride length, we can use any best matching prefix algorithm that can benefit from the higher stride length. We have described two such algorithms, the hashing scheme and the trie scheme. We now describe the trie scheme.

FIG. 19 describes the trie data structure. As discussed earlier each trie node is a table with $2^x$ positions corresponding to all combinations of X bits. Each trie node has a path that leads from the root of the trie node to it. Position J of the Trie Node has two fields: the first is called Pointer[J] and points to trie nodes that are children of this node. The BestPrefix[J] field stores the value of any prefix that would have been stored at the node (if any) pointed to by Pointer[J].

Figure 20:
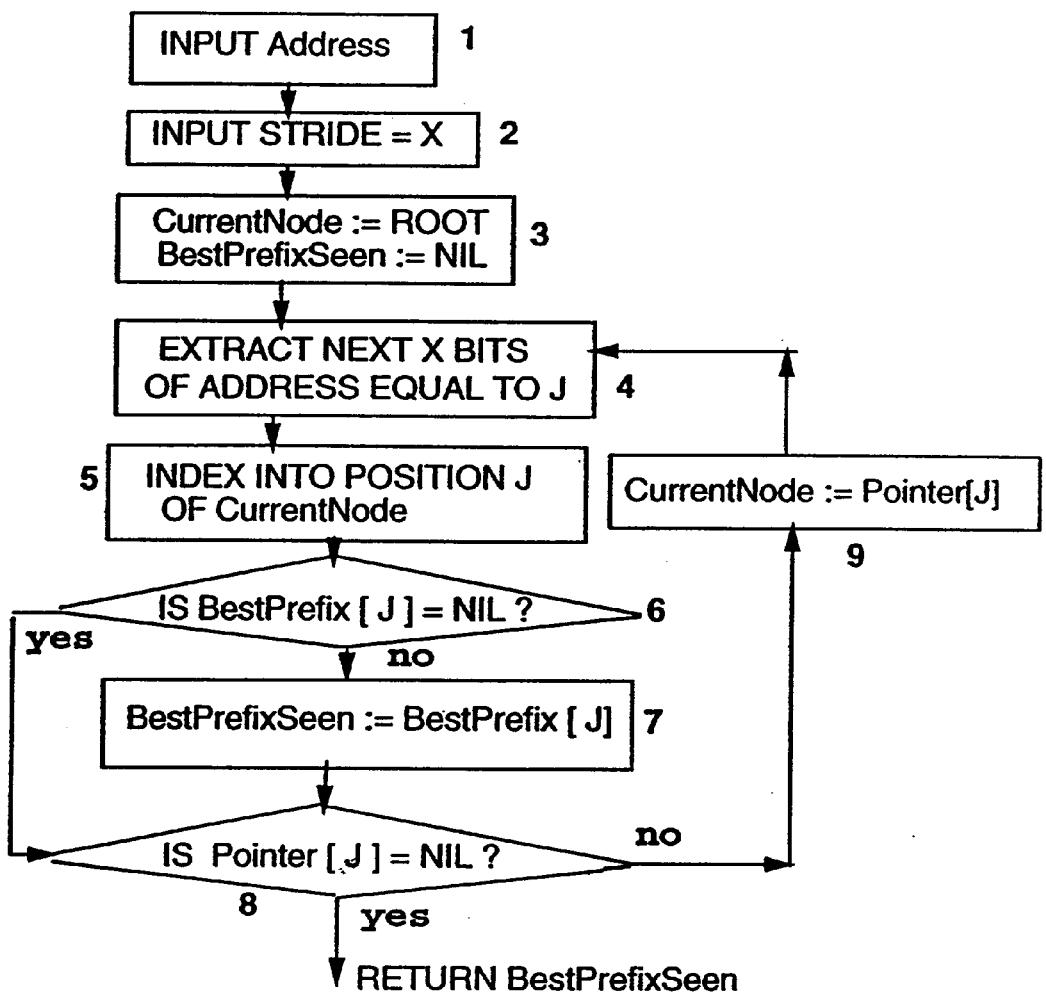
FIG. 20 is a flow chart for a program to implement fast best matching prefix lookup using tries.

The algorithm for best matching prefix code is shown in FIG. 20. We start (1) by reading the address and (2) stride length. Next, we initialize (3) a variable CurrentNode (which keeps track of the current node in the trie that we have reached in the search) to the ROOT of the trie. We also initialized (3) a variable called BestPrefixSeen to NIL. This variable keeps track of the best matching prefix we have seen so far in our search.

In (4), we start the main loop by extracting the next X bits of the address (whose value is say J). We then (5) use this to index into position J of CurrentNode (see FIG. 19). If this position has a BestPrefix field that is not equal to NIL, we update BestPrefixSeen to this value (6, 7). Finally, if Pointer [J] is not equal to NIL, we continue the main loop by returning to (4). Otherwise, we terminate and return BestPrefixSeen as the best matching prefix of the address we input.

The benefits of controlled expansion to reduce prefix lengths can easily be seen from this algorithm. If we expand IPv4 addresses to be lengths that are 16, 24, and 32, we only have 3 READs to memory for doing trie search to an arbitrary length routing database. Even if we have a million entries, we only take 3 READs to memory. With memory speeds in the order of 60 nsec, this implies a search time of 180 nsec, an order of magnitude faster than current implementation that take over 1 μsec for much smaller table sizes. The memory needs of our invention are also reasonable. Aside from a root node with 64K positions, all other trie nodes use only 256 positions. The memory needs are extremely feasible given the cheapness of modern memory.

Our preferred embodiment is a trie. There are a number of variants of the basic trie scheme described hereto which this invention applies. For example, the Berkeley UNIX implementation Keith Sklower. A tree-based routing table for berkeley unix. Technical report, University of California, Berkeley applies a simple optimization to remove any path of trie nodes that have exactly one pointer each. It does so by using a skip count. This optimization reduces storage needs for the trie. Our controlled expansion algorithm remains exactly the same but our lookup and trie building algorithms would change slightly to incorporate this new idea. An alternative to skip counts (which results in faster search times) is to replace any path of trie nodes that have exactly one pointer each with a text string corresponding to the path. This idea is called Path Compression and is described in an earlier patent application H. Wilkinson, G. Varghese and N. Poole, Compressed Prefix Matching Database Searching, U.S. patent application Ser. No. 07/378,718 December 89. Issued in Australia as Patent 620994.

Once again, our controlled expansion scheme remains unchanged but the lookup and trie building algorithms need to be modified very slightly.

Finally, we note that our scheme can also be used to improve the performance of schemes that rely on multiple exact matches, either done in sequence or done in parallel (e.g., Anthony J. Bloomfeld N.J. McAuley, Paul F. Lake Hopatcong N.J. Tsuchiya, and Daniel V. Rockaway Township Morris County N.J. Wilson. Fast multilevel hierarchical routing table using content-addressable memory. U.S. patent Ser. No. 034444. Assignee Bell Communications research Inc. Livingston N.J., January, 1995]). In the sequential case, our scheme improves search time by reducing the number of distinct prefix lengths and hence reducing the number of sequential searches. In the parallel case (e.g., Anthony J. Bloomfeld N.J. McAuley, Paul F. Lake Hopatcong N.J. Tsuchiya, and Daniel V. Rockaway Township Morris County N.J. Wilson. Fast multilevel hierarchical routing table using content-addressable memory. U.S. patent Ser. No. 034444. Assignee Bell Communications research Inc. Livingston N.J., January, 1995]), we reduce the number of Content Addressable Memories.

The present invention has been described in terms of a method and apparatus for implementing the controlled expansion of arbitrary length prefixes into defined length prefixes which may be matched by searching through lookup tables with multiple digits of address data defined as a stride to reduce the lookup time for prefix routing information. These methods are readily implemented in software by ordinary programming techniques known to those of ordinary skill in the art using the present disclosure including the flow chart and explanatory text as a guide. Alternatively, the logic may be "hard wired", constructed into a custom chip set, or used in a mixed hardware/software environment such as in programmable chip sets. The present invention in its elegant simplicity may be readily adapted to virtually many routing environment as would be apparent to those of ordinary skill in the art.

While the present invention has been described by reference to a specific embodiment, it should be understood that modifications and variations of the invention may be constructed without departing from the scope of the invention defined in the following claims.

What is claimed is:

1. A method for routing data packets through an electronic routing device, said data packets having an address indicative of a desired destination, and said routing device having means for receiving a plurality of prefixes, each of said prefixes corresponding to a desired output data link, said method comprising the steps of:

a) expanding if necessary a received prefix into a plurality of prefixes having a length equal to one of a plurality of preselected stride lengths, b) reading the address of a data packet desired to be routed, c) matching the address in packet with a corresponding prefix entry in a look up table, and d) routing the data packet to an output data link corresponding to said prefix entry contained in said look up table.

2. The method of claim 1 wherein the matching step includes the step of matching the address with a read step for each stride length contained in the length of the address until a best match is obtained.

3. The method of claim 2 wherein each read step includes the steps of determining a desired output data link corresponding to a match occurring during said read step.

4. The method of claim 3 wherein each matching step includes the step of substituting any previously determined desired output data link with any newly determined desired output data link so that only the last determined desired output data link is used to route said data packet.

5. The method of claim 4 wherein the step of expanding includes the step of expanding the received prefix with a controlled prefix expansion method.

6. The method of claim 5 wherein the step of expanding includes the steps of expanding the received prefix with a prefix expansion and prefix capture.

7. The method of claim 6 wherein the look up table includes a plurality of sub tables equal in number to the number K of preselected stride lengths, so that each expanded prefix need be matched with at most K read steps.

8. The method of claim 7 further comprising the step of choosing the preselected stride lengths in order to minimize the number of read steps and the memory required to store entries in the look up table.

9. A router for data packets including a plurality of input data links for receiving incoming data packets, a plurality of output data links for dispatching outgoing data packets, an adjustable switch interconnected between said input data links and said output data links for adjustably connecting a selected one of said input data links to a selected one of said output data links, a data processor connected to said switch and having means for controlling said switch, and said data processor having means for expanding if necessary a received prefix into a plurality of prefixes equal to one of a plurality of pre-selected stride lengths, means for accessing a look up table to match a destination address of a data packet with a pre-recorded corresponding entry, and means for adjusting said switch in response to a matching entry in said look up table to thereby route a data packet appearing at an input data link to a corresponding output data link.

10. The router of claim 9 wherein said look up table is comprised of a plurality of prefix entries, each of said prefix entries having a prefix whose length is equal to a stride length and a corresponding output data link.

11. The router of claim 10 wherein said look up table is arranged in a trie hierarchy.

12. The router of claim 11 wherein a pointer and a desired output data link pair is associated with at least some of said table entries and wherein said processor has means for reading said desired output data link in the same read step as in reading a pointer to a next trie node.

13. The router of claim 11 wherein said processor has means for expanding said look up table to accommodate new prefixes.

14. The router of claim 13 wherein said look up table expansion means includes means for expanding prefixes of arbitrary length into prefixes whose length are multiples of a desired fixed length L.

15. The router of claim 14 wherein said look up table expansion means includes means for comparing and eliminating from the look up table any entries created by expansion which duplicate existing prefix entries.

16. A method for creating a look up table of expanded prefixes for data packets from a plurality of arbitrary prefixes, said arbitrary prefixes having an arbitrary length and being indicative of a desired plurality of destinations, said expanded prefixes having a length equal to one of a plurality of preselected stride lengths, said method comprising the steps of:

a) comparing the length of each arbitrary prefix with the plurality of stride lengths, b) expanding each arbitrary prefix by determining look up table entries for all possible combinations of prefixes having the nearest next largest stride length H for those arbitrary prefixes whose length does not match one of the plurality, c) comparing each added expanded prefix with other look up table entries and discarding it if an entry already exists, and d) adding the non-discarded expanded prefix entries to the look up table.

17. The method of claim 16 further comprising the steps of ordering all arbitrary length prefixes by their length, starting with the shortest prefix, and repeating steps a) to c) until all arbitrary length prefixes have been processed.

18. The method of claim 17 further comprising the steps of determining a maximum length which is the smallest number greater than W in the plurality, where W is the length of the longest arbitrary prefix, and using said determined maximum length for the steps a) to c).

19. The method of claim 16 wherein the expanding step includes the step of determining the nearest next smallest stride length S and repeating the steps a) through c) only for the arbitrary prefixes whose lengths lie between S and H.

20. A method for programming a routing device for routing data packets, each of said data packets having an address indicative of a desired destination to be compared with a set of prefixes contained in said routing device, the method comprising the steps of:

receiving a prefix of arbitrary length, expanding if necessary the prefix into a plurality of prefixes having a length equal to one of a plurality of preselected stride lengths, and storing the expanded prefixes for later routing of data packets.

* * * * *